(12) United States Patent
Son et al.

(10) Patent No.: US 10,317,694 B2
(45) Date of Patent: Jun. 11, 2019

(54) COLOR FILTER-INTEGRATED POLARIZER AND METHOD OF MANUFACTURING THE SAME

(71) Applicant: Samsung Display Co. Ltd., Yongin, Gyeonggi-Do (KR)

(72) Inventors: Jung Ha Son, Seoul (KR); Joo Hyung Lee, Seongnam-si (KR); Yun Jong Yeo, Seoul (KR)

(73) Assignee: Samsung Display Co., Ltd. (KR)

( * ) Notice: Subject to any disclaimer, the term of this patent is extended or adjusted under 35 U.S.C. 154(b) by 9 days.

(21) Appl. No.: 14/727,186

(22) Filed: Jun. 1, 2015

(65) Prior Publication Data
US 2016/0147080 A1 May 26, 2016

(30) Foreign Application Priority Data
Nov. 20, 2014 (KR) .......................... 10-2014-0162754

(51) Int. Cl.
*G02B 27/28* (2006.01)
*G02F 1/1335* (2006.01)
(Continued)

(52) U.S. Cl.
CPC ........... *G02B 27/288* (2013.01); *G02B 5/008* (2013.01); *G02B 5/204* (2013.01); *G02B 5/3058* (2013.01);
(Continued)

(58) Field of Classification Search
CPC ...... G02B 5/008; G02B 5/204; G02B 5/3058; G02B 27/288; G02F 1/133514;
(Continued)

(56) References Cited

U.S. PATENT DOCUMENTS

| | | | | |
|---|---|---|---|---|
| 6,040,936 A | * | 3/2000 | Kim ........................ | G02B 5/008 359/245 |
| 6,285,020 B1 | * | 9/2001 | Kim ........................ | B82Y 20/00 250/201.3 |

(Continued)

FOREIGN PATENT DOCUMENTS

EP 2523038 A1 11/2012
KR 10-2011-0070574 A 6/2011
(Continued)

OTHER PUBLICATIONS

Huu, et al. "Realization of integrated polarizer and color filters based on subwavelength metallic gratings using a hybrid numerical scheme," Applied Optics, vol. 50, No. 4, Feb. 1, 2011, p. 415-426.*
(Continued)

*Primary Examiner* — Nicholas R. Pasko
(74) *Attorney, Agent, or Firm* — Innovation Counsel LLP

(57) ABSTRACT

Provided are color filter-integrated polarizer and method of manufacturing a color filter-integrated polarizer. A color filter-integrated polarizer includes a conductive material disposed on a substrate. The conductive material includes a polarizer region which comprises a plurality of parallel conductive wire patterns and a color filter region which comprises a plurality of holes arranged in a pattern.

7 Claims, 18 Drawing Sheets

(51) Int. Cl.
*G02B 5/00* (2006.01)
*G02B 5/20* (2006.01)
*G02B 5/30* (2006.01)

(52) U.S. Cl.
CPC .. *G02F 1/133514* (2013.01); *G02F 1/133528* (2013.01); *G02F 2001/133548* (2013.01); *G02F 2203/10* (2013.01)

(58) Field of Classification Search
CPC ... G02F 1/133528; G02F 2001/133548; G02F 2203/10
USPC .......................... 359/487.03, 487.05, 491.01
See application file for complete search history.

(56) References Cited

U.S. PATENT DOCUMENTS

| | | | |
|---|---|---|---|
| 7,110,154 B2* | 9/2006 | Ballato | G02F 1/353 250/216 |
| 7,206,114 B2* | 4/2007 | Ballato | G02F 1/353 250/216 |
| 7,989,254 B2* | 8/2011 | Yoon | G02B 5/008 257/59 |
| 8,330,904 B2* | 12/2012 | Yoon | G02B 5/008 349/106 |
| 2005/0275934 A1 | 12/2005 | Ballato et al. | |
| 2007/0019292 A1* | 1/2007 | Kim | G02B 5/3058 359/487.03 |
| 2008/0100779 A1 | 5/2008 | Choo et al. | |
| 2008/0252799 A1* | 10/2008 | Lee | G02B 5/3058 349/5 |
| 2010/0091217 A1* | 4/2010 | Kim | G02B 5/3058 349/62 |
| 2010/0296060 A1* | 11/2010 | Huang | G03B 21/142 353/20 |
| 2011/0151605 A1 | 6/2011 | Yoon | |
| 2011/0255028 A1* | 10/2011 | Nishizawa | G02F 1/133553 349/62 |
| 2012/0206676 A1* | 8/2012 | Chung | G02F 1/133516 349/97 |
| 2012/0206678 A1* | 8/2012 | Kim | G02F 1/133516 349/106 |
| 2012/0287506 A1* | 11/2012 | Yao | G02B 5/201 359/491.01 |
| 2013/0300986 A1* | 11/2013 | Kang | G02B 5/3058 349/96 |
| 2014/0016059 A1 | 1/2014 | Lee et al. | |
| 2014/0268332 A1 | 9/2014 | Guo et al. | |
| 2015/0162390 A1 | 6/2015 | Wang et al. | |

FOREIGN PATENT DOCUMENTS

| | | |
|---|---|---|
| KR | 10-2011-0120718 A | 11/2011 |
| KR | 10-2011-0120722 A | 11/2011 |
| KR | 10-2014-0007648 A | 1/2014 |
| KR | 10-2015-0027931 | 3/2015 |
| KR | 10-2015-0029817 | 3/2015 |
| KR | 10-2015-0039639 A | 4/2015 |
| KR | 10-2015-0067587 A | 6/2015 |
| KR | 10-2015-0085161 | 7/2015 |
| KR | 10-2015-0095971 A | 8/2015 |

OTHER PUBLICATIONS

Ye, et al. "Polarizing color filter based on a subwavelength metal-dielectric grating," Applied Optics, vol. 50, No. 10, Apr. 1, 2011, p. 1356-1363.*

Ye, et al. "Compact transflective color filters and polarizers by bilayer metallic nanowire gratings on flexible substrates," IEEE Journal of selected topics in quantum electronics, vol. 19, No. 3, May/Jun. 2013. DOI: 10.1109/JSTQE.2012.2227247.*

European Search Report (dated Dec. 10, 2015) issued by the EPO for European Patent Application No. 15179831.1.

* cited by examiner

COLOR FILTER-INTEGRATED POLARIZER AND METHOD OF MANUFACTURING THE SAME This application claims priority from Korean Patent Application No. 10-2014-0162754 filed on Nov. 20, 2014 in the Korean Intellectual Property Office, the disclosure of which is incorporated herein by reference in its entirety.

BACKGROUND

1. General Field

The present invention relates to a color filter-integrated polarizer and a method of manufacturing the same.

2. Description of the Related Art

A display device includes a color filter for expressing colors and includes a polarizer depending on a driving method.

In particular, a liquid crystal display (LCD) controls the brightness of a pixel by converting light incident from a backlight unit into specific polarized light using a polarizer and transmitting and/or blocking the polarized light and expresses a color using a color filter of each pixel.

Generally, a polarizing plate and a color filter are provided as separate elements.

SUMMARY

Aspects of the present disclosure provide a color filter-integrated polarizer and a method of manufacturing the same.

However, aspects of the present disclosure are not restricted to the one set forth herein. The above and other aspects of the present inventive concept will become more apparent to one of ordinary skill in the art to which the present inventive concept pertains by referencing the detailed description given below.

According to an aspect of the present disclosure, there is provided a color filter-integrated polarizer including a conductive material having a polarizer region and a color filter region. The polarizer region has a plurality of conductive wire patterns formed along an edge of the conductive material, and a color filter region having a plurality of holes formed in a pattern across the color filter region.

According to another aspect of the present inventive concept, there is provided a method of manufacturing a color filter-integrated polarizer, the method comprising forming a resin layer on a substrate, patterning the resin layer, forming a conductive material layer on the patterned resin layer, and forming a plurality of holes in an upper part of the conductive material layer, wherein the holes are arranged in a pattern.

According to still another aspect of the present inventive concept, there is provided a method of manufacturing a color filter-integrated polarizer, the method comprising forming a resin layer on a substrate, forming resin patterns by patterning the resin layer, removing a remaining layer between the resin patterns of the resin layer, forming a conductive material layer on the substrate and the resin patterns, and forming a plurality of holes arranged in a pattern in an upper part of the conductive material layer.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
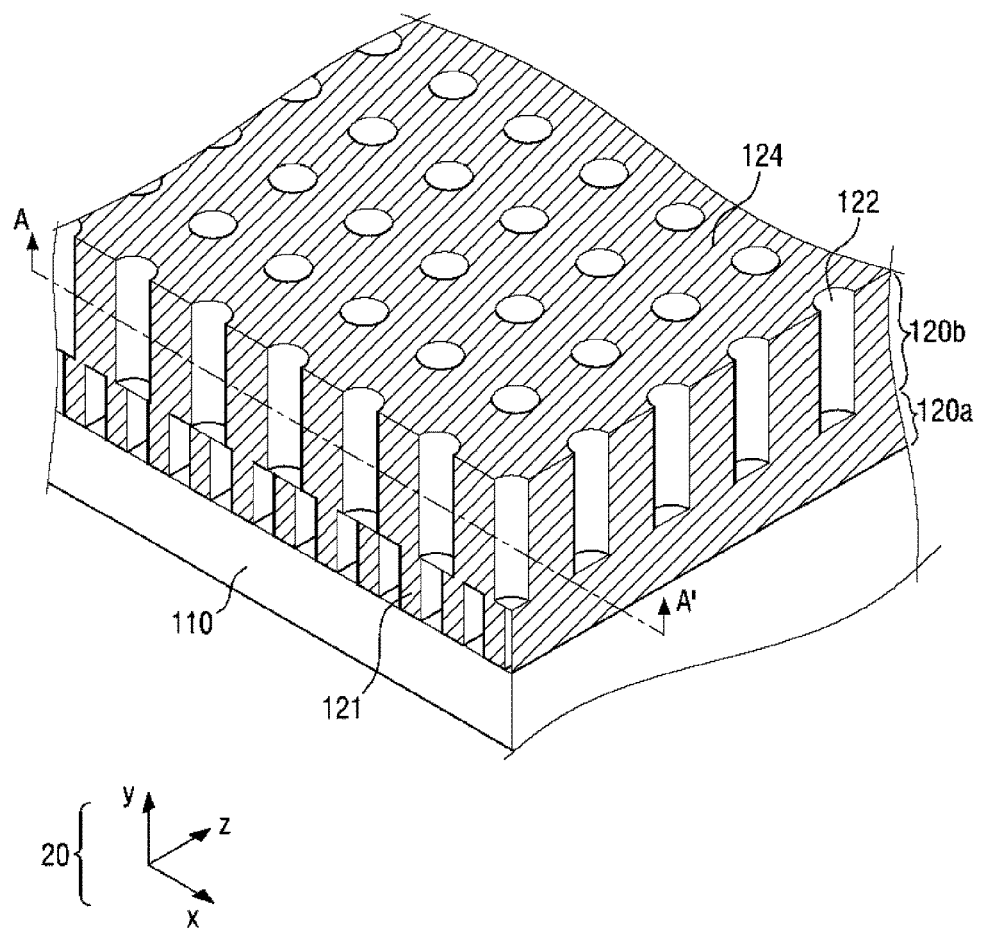
FIG. 1 is a partial perspective view of a color filter-integrated polarizer according to an embodiment of the present disclosure.

The aspects and features of the present disclosure and methods for achieving the aspects and features will be apparent by referring to the embodiments to be described in detail with reference to the accompanying drawings. However, the present inventive concept is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the inventive concept, and the present disclosure is only defined within the scope of the appended claims. In the entire description, the same reference numerals are used for the same elements across various figures. In the drawings, sizes and relative sizes of layers and areas may be exaggerated for clarity in explanation.

The term "on" that is used to designate that an element is on another element located on a different layer or a layer includes both a case where an element is located directly on another element or a layer and a case where an element is located on another element via another layer or still another element.

Although the terms "first, second, and so forth" are used to describe diverse constituent elements, such constituent elements are not limited by the terms. The terms are used only to discriminate a constituent element from another constituent element. Accordingly, in the following description, a first constituent element may be a second constituent element.

Exemplary embodiments will hereinafter be described with reference to the accompanying drawings. A "pattern," as used herein, is intended to mean an arrangement with some type of regularity, for example in order, placement, size, and/or spacing.

Figure 2:
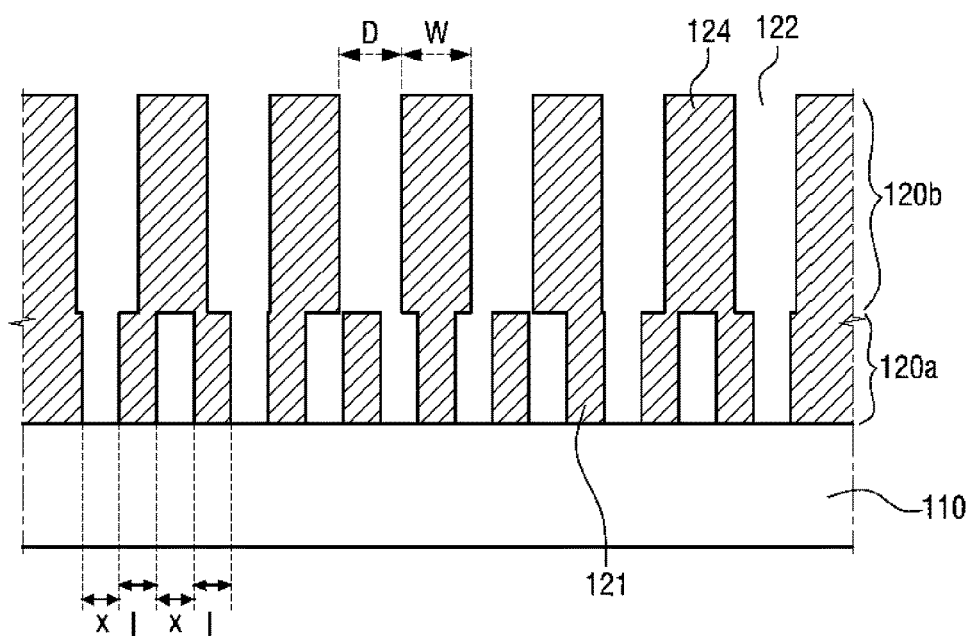
FIG. 2 is a vertical cross-sectional view of the color filter-integrated polarizer taken along the line A-A' of FIG. 1.

FIG. 1 is a partial perspective view of a color filter-integrated polarizer according to an embodiment of the disclosure. FIG. 2 is a vertical cross-sectional view of the color filter-integrated polarizer taken along the line A-A' of FIG. 1. As shown by a coordinate 20, the color-filter-integrated polarizer has elements extending in x-axis, y-axis, and z-axis.

Referring to FIGS. 1 and 2, the color filter-integrated polarizer according to the current embodiment is a structure formed of a conductive material 124 on a substrate 110. In FIGS. 1 and 2, the conductive material 124 is shown by shading. A lower region of the color filter-integrated polarizer which contacts the substrate 110 may be a polarizer region 120a, and an upper region of the color filter-integrated polarizer may be a color filter region 120b. In the particular embodiment, the color filter region 120b and the polarizer region 120a are stacked on top of each other.

The polarizer region 120a may include a wire grid polarizer having a plurality of parallel conductive wire patterns 121.

The conductive wire patterns 121 may be made of any conductive material. In an exemplary embodiment, the conductive wire patterns 121 may be made of, but not limited to, a metal material, more specifically, one metal selected from the group consisting of aluminum (Al), chrome (Cr), silver (Ag), copper (Cu), nickel (Ni), titanium (Ti), cobalt (Co) and molybdenum (Mo) or any alloy of these metals.

The conductive wire patterns 121 may be arranged parallel to one another separated by a space having a width X in the x-direction (shown in FIG. 2). Each of the conductive wire patterns 121 have a width l, as shown in FIG. 2. As used herein, "X+l" will be referred to as a "period" of the conductive wire patterns 121 in the polarizer region 120a. The shorter the period of the conductive wire patterns 121 is compared with a wavelength of incident light, a higher polarization extinction ratio can be achieved. However, it is more difficult to manufacture the conductive wire patterns 121 with shorter period. A visible light region typically ranges from 380 to 780 nm. Thus, to have a high extinction ratio for three primary colors of light (i.e., red (R), green (G) and blue (B)), a wire grid polarizer should have a period of at least 200 nm or less. Only then can polarization characteristics be expected. However, to have the same or better polarization performance as a conventional polarizer, the wire grid polarizer should have a period of 120 nm or less.

Each of the conductive wire patterns 121 may have a width l of 10 to 200 nm, wherein the exact width may be chosen to exhibit the desired polarization performance. In addition, each of the conductive wire patterns 121 may have a thickness of 10 to 500 nm, "thickness" measured in the y-direction according to the coordinate 20. The dimensions given above are for example embodiments and not limitations of the inventive concept. The conductive wire pattern 121 may be formed one face of the conductive material 124

For superior polarization characteristics, a space between the conductive wire patterns 121 may have a refractive index of 1.0 to 1.3. In some embodiments, the space may contain ambient air. In other embodiments, the space may be a vacuum.

Although not illustrated in the drawings, a buffer layer may additionally be provided between the substrate 110 and the conductive wire patterns 121.

The color filter region 120b may include a plurality of holes 122 arranged in a pattern in the conductive material.

The color filter region 120b may include a plasmonic color filter. The plasmonic color filter may consist of a conductive material and a plurality of holes 122 having a predetermined period formed in the conductive material.

Here, selected RGB light of specific wavelengths is transmitted according to a size D and a period (D+W) of a hole, thereby implementing RGB colors. The size D may be, for example, a width of a hole that has a round (e.g., circular, semi-circular) cross section. A greater amount of light than the light illuminating a hole area may be transmitted by light bring into near the hole. This can improve the luminance of a display device.

Plasmons are quasiparticles that free electrons induce on a surface of a conductive layer and oscillate collectively in response to an electric field of incident light. A surface plasmon refers to a plasmon that is confined to the surface of the conductive layer and corresponds to an electromagnetic wave propagating along an interface between the conductive layer and a dielectric.

In addition, a surface plasmon phenomenon refers to forming light of a specific wavelength as light of a specific wavelength incident on a surface of a conductive layer having nano-sized periodic hole patterns resonates with free electrons on the surface of the conductive layer. Only light of specific wavelengths that can form surface plasmons is transmitted through the hole, and light of other wavelengths is made to be reflected from the metal surface.

Generally, a thick conductive layer does not transmit light efficiently. If a hole formed in the conductive layer has a size much smaller than a wavelength of incident light, the intensity of transmitted light significantly decreases. However, if the small holes have a width that is smaller than the wavelength of the incident light and the holes are arranged in a pattern in the conductive layer, the amount of light that is transmitted significantly increases due to excitation of a surface plasmon. Generally, a dispersion curve of light or photon does not cross a dispersion curve of a surface plasmon. In order to directly couple the photon to the surface plasmon, a grating structure of hole patterns having a predetermined period is formed on the surface of the conductive material 124. This may satisfy the conservation of momentum, thereby causing the surface plasmon to be excited.

A prime peak wavelength of light transmitted through the plasmonic color filter—that is, a surface plasmon resonance wavelength—may be controlled by changing the period of the holes 122 or by changing a dielectric constant of a dielectric material adjacent to the conductive material.

In the drawings, a horizontal cross-section of each of the holes 122 is circular. However, the present inventive concept is not limited thereto, and the horizontal cross-section of each of the holes 122 can have various shapes such as an oval shape, a polygonal shape, and a slit shape. When each of the holes 122 has a rounded (e.g., circular) cross-sectional shape as illustrated in the drawings, the size D of each of the holes 122 may be in a range of 100 to 300 nm, and a gap W between the holes 122 may be in range of 200 to 700 nm. The size D of each of the holes 122 and the gap W between the holes 122 may be adjusted within the above ranges, such that desired wavelengths will be transmitted.

The holes 122 may extend along the y-axis to a depth corresponding to the top surfaces of the conductive wire patterns 121.

The conductive wire patterns 121 may be integrally formed with the conductive material of the color filter region 120b.

Figure 3:
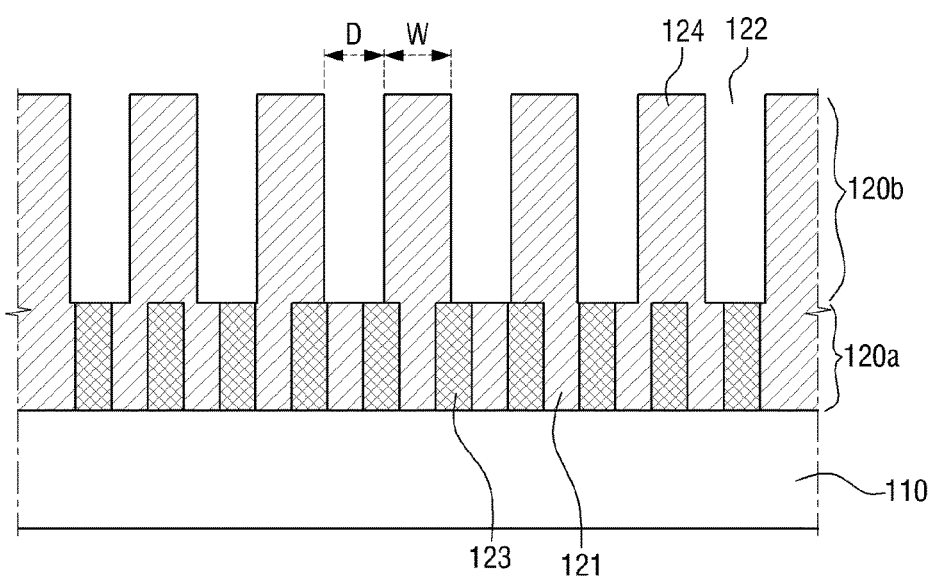
FIG. 3 is a vertical cross-sectional view of a color filter-integrated polarizer according to another embodiment of the present disclosure.

FIG. 3 is a vertical cross-sectional view of a color filter-integrated polarizer according to another embodiment.

Referring to FIG. 3, the color filter-integrated polarizer according to the current embodiment is a structure formed of a conductive material on a substrate 110. A lower region of the color filter-integrated polarizer which contacts the substrate 110 may be a polarizer region 120a, and an upper region of the color filter-integrated polarizer may be a color filter region 120b.

The polarizer region 120a may include a wire grid polarizer having a plurality of parallel conductive wire patterns 121 and patterned resin 123 formed in a space between the conductive wire patterns 121.

The patterned resin 123 may have a refractive index of 1.0 to 1.3 in order for superior polarization characteristics of the wire grid polarizer.

Other elements of FIG. 3 are substantially similar to those of FIG. 2, and thus a redundant description thereof is omitted.

Figure 4:
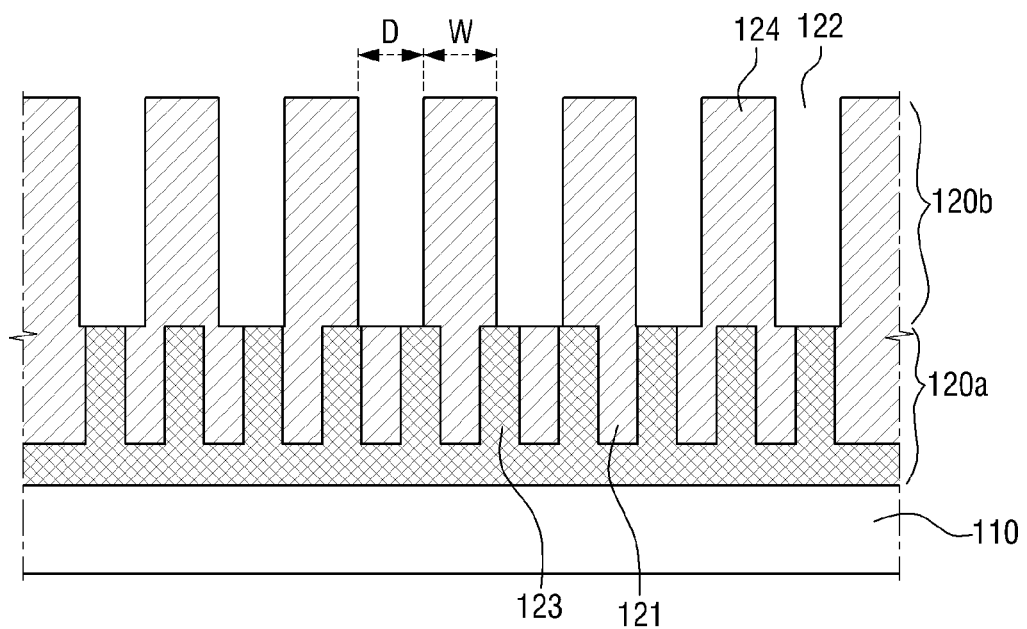
FIG. 4 is a vertical cross-sectional view of a color filter-integrated polarizer according to another embodiment of the present disclosure.

FIG. 4 is a vertical cross-sectional view of a color filter-integrated polarizer according to another embodiment.

Referring to FIG. 4, the color filter-integrated polarizer according to the current embodiment is a structure formed of a conductive material on patterned resin 123 formed on a substrate 110. A lower region of the color filter-integrated polarizer which contacts the patterned resin 123 may be a polarizer region 120a, and an upper region of the color filter-integrated polarizer may be a color filter region 120b.

The polarizer region 120a may include a wire grid polarizer having a plurality of parallel conductive wire patterns 121 and the patterned resin 123 formed in a space between the conductive wire patterns 121.

The patterned resin 123 may have a refractive index of 1.0 to 1.3 in order for superior polarization characteristics of the wire grid polarizer.

Other elements of FIG. 4 are identical or correspond to those of FIG. 2, and thus a redundant description thereof is omitted.

Figure 5:
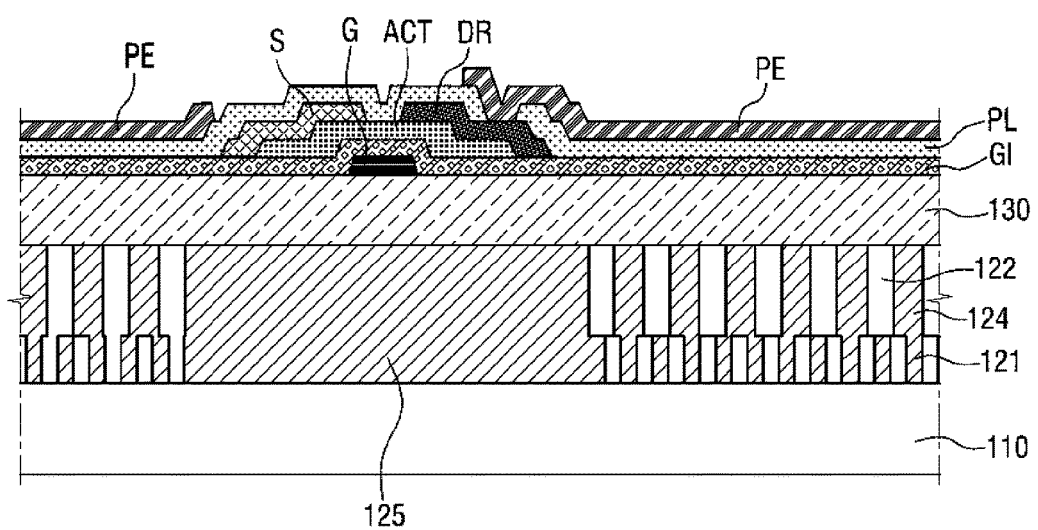
FIG. 5 is a schematic cross-sectional view of a lower substrate of a display device according to an embodiment of the present disclosure.

FIG. 5 is a schematic cross-sectional view of a lower substrate of a display device according to an embodiment. The color filter-integrated polarizer such as the embodiment depicted in FIG. 1 may be combined with the lower substrate of FIG. 5 to form a display device.

Referring to FIG. 5, the lower substrate may be a thin-film transistor (TFT) substrate. A TFT may be configured as follows. A gate electrode G is located on a protective layer 130 formed on a color filter-integrated polarizer, and a gate insulating layer GI is located on the gate electrode G and the protective layer 130. A semiconductor layer ACT is located on at least a region of the gate insulating layer GI which overlaps the gate electrode G, and a source electrode S and a drain electrode DR are located on the semiconductor layer ACT to be separated from each other. A passivation layer PL is located on the gate insulating layer GI, the source electrode S, the semiconductor layer ACT, and the drain electrode DR. A pixel electrode PE is located on the passivation layer PL and electrically connected to the drain electrode DR via a contact hole which at least partially exposes the drain electrode DR.

The protective layer 130 may be formed as a double layer. For example, a LiF layer may be formed, and then an insulating layer may be formed on top of the LiF layer. However, the inventive concept is not limited thereto. To prevent color mixing of light as it is transmitted through a plasmonic color filter, a material without physical properties that can affect transmission wavelengths may be selected to form the protective layer 130.

A region in which the TFT is located does not transmit light. Thus, the region is called a "non-aperture region." A reflective layer 125 without conductive wire patterns 121 of a wire grid polarizer may be formed at a location corresponding to the non-aperture region. In this case, a metal material having high reflectivity may reflect light incident upon the non-aperture region, and the reflected light may be used in an aperture region. Therefore, the luminance of the display device can be improved.

However, the configuration of the color filter-integrated polarizer is not limited to the above example. Although not illustrated in the drawing, the conductive wire patterns 121 of the wire grid polarizer can also be formed at the location corresponding to the non-aperture region. In addition, color filter holes 122 can also be formed in the non-aperture region.

Referring to FIG. 5 together with FIG. 2, the pixel electrode PE may be formed on each of left and right sides of the non-aperture region in which the TFT is formed. In this case, left and right pixels respectively located on the left and right sides of the non-aperture region may display different colors. The aperture regions to the left and right of the transistor may have the holes 122 of different sizes D and different periods (D+W). The dimensions of the color filter region (D, W) are larger than the dimensions of the polarizer region 120a (x, l).

In a specific example, a plurality of holes 122 having a predetermined size and period may be located adjacent to each other to form one group in a region corresponding to the aperture region of the right of the transistor, and a plurality of holes 122 having a predetermined size and period, which are different from those of the holes 122 in the region corresponding to the aperture region of the right pixel, may be located adjacent to each other to form one group in a region corresponding to the aperture region to the left of the transistor.

In a typical display device having RGB colors (i.e., three primary colors) arranged in repeating groups, three groups of hole patterns having three types of periods and sizes may be arranged in a predetermined order, sometimes in a repeating pattern. For example, the hole patterns for a red pixel may have a size and a period that are different from the size and period of the hole patterns for a green pixel or a blue pixel. However, the present inventive concept is not limited thereto, and the formation of the hole patterns can vary due to the irregular arrangement of pixels.

The display device may further include a backlight unit which is located under the lower substrate and emits light, a liquid crystal panel which includes the lower substrate, a liquid crystal layer and an upper substrate, and an upper polarizing plate which is located on the liquid crystal panel.

In this case, the transmission axes of the upper polarizing plate and the wire grid polarizer may be orthogonal or parallel to each other. The upper polarizing plate may be formed as a wire grid polarizer or may be a conventional polyvinyl acetate (PVA)-based polarizing film. The upper polarizing plate can also be omitted in some embodiments.

Although not specifically illustrated in the drawing, the backlight unit may include a light guide plate (LGP), one or more light source units, a reflective member, an optical sheet, etc.

The LGP changes the path of light generated by the light source units toward the liquid crystal layer. The LGP may include an incident surface upon which light generated by the light source units is incident and an exit surface which faces the liquid crystal layer. The LGP may be made of, but is not limited to, a material having light-transmitting properties such as polymethyl methacrylate (PMMA) or a material having a constant refractive index such as polycarbonate (PC).

Light incident upon a side surface or both side surfaces of the LGP made of the above materials has an angle smaller than a critical angle of the LGP. Thus, the light is delivered into the LGP. When the light is incident upon an upper or lower surface of the LGP, the angle of incidence is greater than the critical angle. Thus, the light is evenly delivered within the LGP without exiting from the LGP.

Scattering patterns may be formed on any one of the upper and lower surfaces of the LGP. For example, the scattering patterns may be formed on the lower surface of the LGP which faces the exit surface so as to make guided light travel upward. That is, the scattering patterns may be printed on a surface of the LGP using ink, such that light reaching the scattering patterns within the LGP can exit upward from the LGP. The scattering patterns can be printed using ink as described above. However, the present invention is not limited thereto, and the scattering patterns can take various forms such as micro grooves or micro protrusions on the LGP.

The reflective member may be further provided between the LGP and a bottom portion of a lower housing member. The reflective member reflects light output from the lower surface (which faces the exit surface) of the LGP back to the LGP. The reflective member may be in the form of, but not limited to, a film.

The light source units may be placed to face the incident surface of the LGP. The number of the light source units can be changed as desired. For example, only one light source unit may be provided to correspond to a side surface of the LGP, or three or more light source units may be provided to correspond to three or more of four side surfaces of the LGP. Alternatively, a plurality of light source units may be placed to correspond to any one of the side surfaces of the LGP. While a side light structure in which a light source is placed on a side of the LGP has been described as an example, a direct structure, a surface light source structure, etc. can also be used according to the configuration of the backlight unit.

A light source used may be a white light-emitting diode (LED) which emits white light or may include a plurality of LEDs which emit red light, green light and blue light. If the light source is implemented as a plurality of LEDs that emit red light, green light and blue light, the LEDs may be turned on simultaneously to produce white light through color mixing.

The upper substrate may include a black matrix for preventing the leakage of light and a common electrode (i.e., an electric field-generating electrode) made of transparent conductive oxide such as indium tin oxide (ITO) or indium zinc oxide (IZO). The black matrix and the common electrode may be formed on a lower surface of a member made of a transparent insulating material such as glass or plastic.

The liquid crystal layer rotates a polarization axis of incident light. The liquid crystal layer is aligned in a specific direction and located between the upper substrate and the lower substrate. The liquid crystal layer may be of, but is not limited to, a twisted nematic (TN) mode, a vertical alignment (VA) mode or a horizontal alignment (IPS, FFS) mode having positive dielectric anisotropy.

FIGS. 6 through 10 are cross-sectional views illustrating steps of a method of manufacturing a color filter-integrated polarizer according to an embodiment of the present invention.

Figure 6:
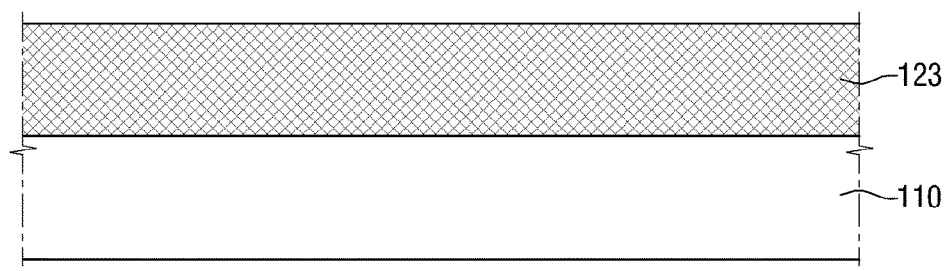
FIGS. 6, 7, 8, 9, and 10 are cross-sectional views illustrating a method of manufacturing a color filter-integrated polarizer according to an embodiment of the present disclosure.

Referring to FIG. 6, a resin layer 123 may be formed on a substrate 110.

The substrate 110 can be made of any material capable of transmitting visible light. The material that forms the substrate 110 may be selected according to the purpose of use or a process. Examples of the material may include various polymers such as, but not limited to, glass, quartz, acrylic, triacetylcellulose (TAC), cyclic olefin copolymer (COC), cyclic olefin polymer (COP), polycarbonate (PC), polyethylene naphthalate (PET), polyimide (PI), polyethylene naphthalate (PEN), polyether sulfone (PES), and polyarylate (PAR). The substrate 110 may also be made of an optical film having a certain degree of flexibility.

The resin layer 123 can be made of any non-conductive material. For polarization characteristics of the polarizer, the non-conductive material may have a refractive index of 1.0 to 1.3.

Figure 7:
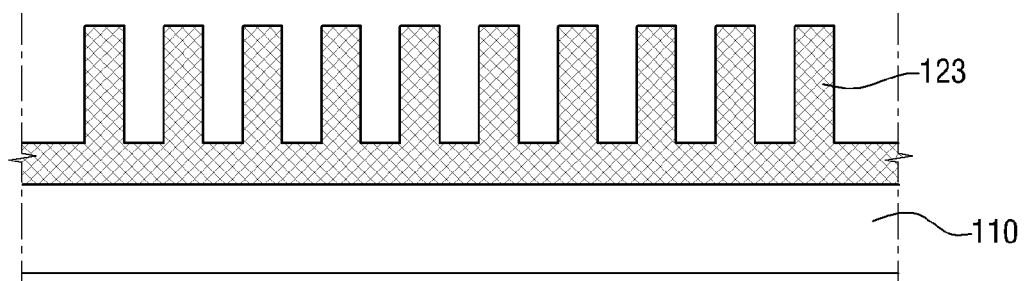

Referring to FIG. 7, the resin layer 123 may be patterned.

The resin layer 123 can be patterned using any method that can form patterns of a desired nano size. Examples of the patterning method include, but are not limited to, nano-imprinting, photoresist, double patterning technology (DPT), and block copolymer (BCP) alignment patterning.

Here, a bottom portion of the patterned resin layer 123 may remain.

Figure 8:
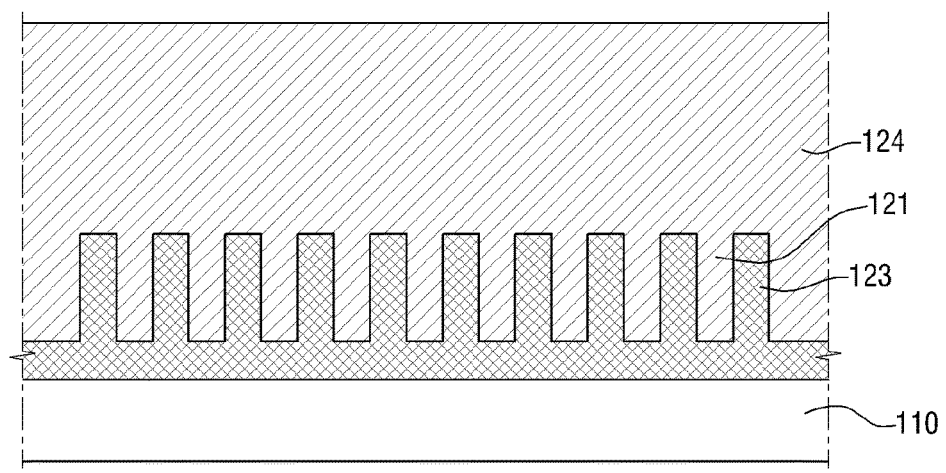

Referring to FIG. 8, conductive wire patterns 121 and a conductive material 124 may be formed on the entire surface of the patterned resin layer 123. The conductive wire patterns 121 may be formed in spaces of the patterned resin layer 123 using, but not limited to, long-throw sputtering, self-ionized sputtering or electroless plating having superior gap-filling characteristics.

Even if the conductive material 124 is formed using a process having superior gap-filling characteristics, an upper surface of the conductive material 124 may not be even due to the effect of the patterned resin layer 123. In this case, the upper surface of the conductive material 124 may be planarized by etching or chemical mechanical polishing (CMP). However, the present invention is not limited to these methods. In a nonrestrictive example, the upper surface of the conductive material 124 may be planarized by repeating a deposition process and an etching process a number of times.

Figure 9:
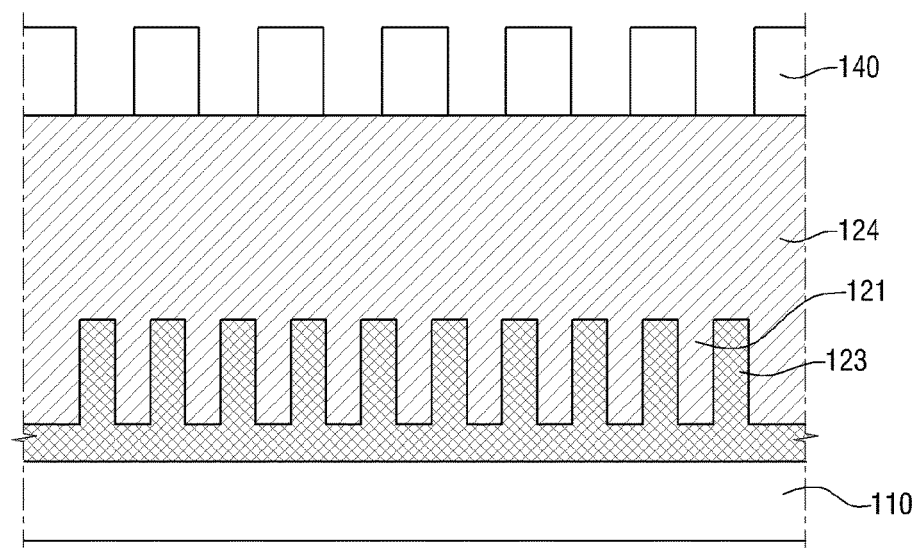

Referring to FIG. 9, mask patterns 140 may be formed on the conductive material 124. The mask patterns 140 may be formed using, but not limited to, nano-imprinting, photoresist, etc.

Figure 10:
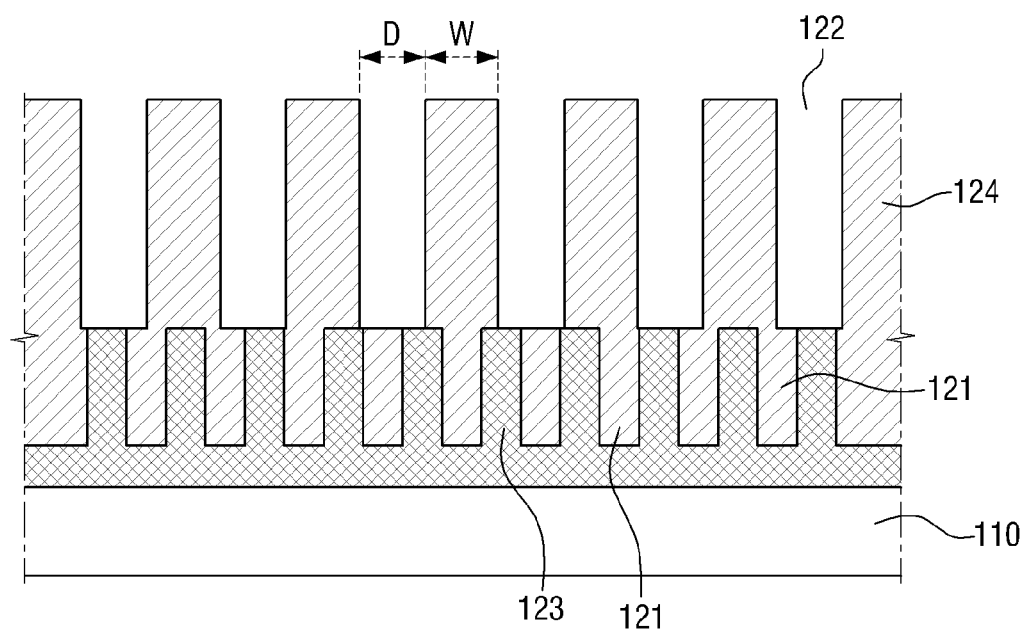

Referring to FIG. 10, a plurality of holes 122 may be formed by etching the conductive material 124 using the mask patterns 140. In a first region (not illustrated), a plurality of holes having a predetermined size D1 and period (D1+W1) may be located adjacent to each other to form one group. In a second region (not illustrated), a plurality of holes having a predetermined size D2 and period (D2+W2), which are different from those of the holes in the first region, may be located adjacent to each other to form one group.

FIGS. 11 through 17 are cross-sectional views illustrating a method of manufacturing a color filter-integrated polarizer according to another embodiment.

Figure 11:
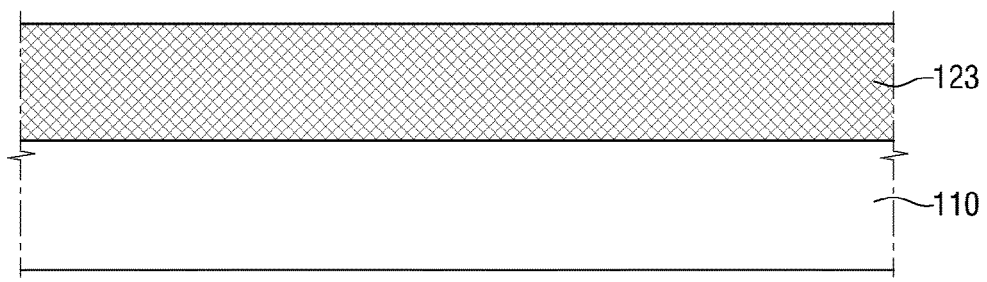
FIGS. 11, 12, 13, 14, 15, 16, and 17 are cross-sectional views illustrating a method of manufacturing a color filter-integrated polarizer according to another embodiment of the present disclosure.

Referring to FIG. 11, a resin layer 123 may be formed on a substrate 110.

The resin layer 123 can be made of any non-conductive material. For polarization characteristics of the polarizer, the non-conductive material may have a refractive index of 1.0 to 1.3.

Figure 12:
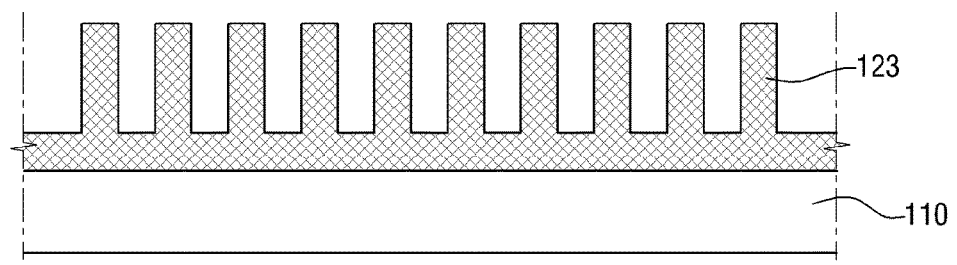

Referring to FIG. 12, the resin layer 123 may be patterned.

The resin layer 123 can be patterned using any method that can form patterns of a desired nano size. Examples of the patterning method include, but are not limited to, nano-imprinting, photoresist, DPT, and BCP alignment patterning.

Figure 13:
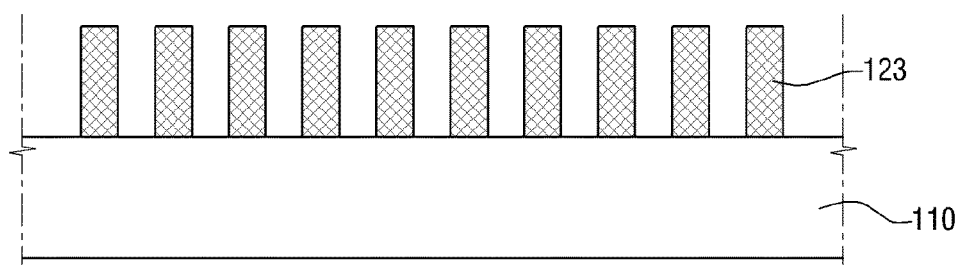

Referring to FIG. 13, the remaining bottom portion of the patterned resin layer 123 may be removed. The removal of the bottom portion may be achieved using, but not limited to, etching.

Figure 14:
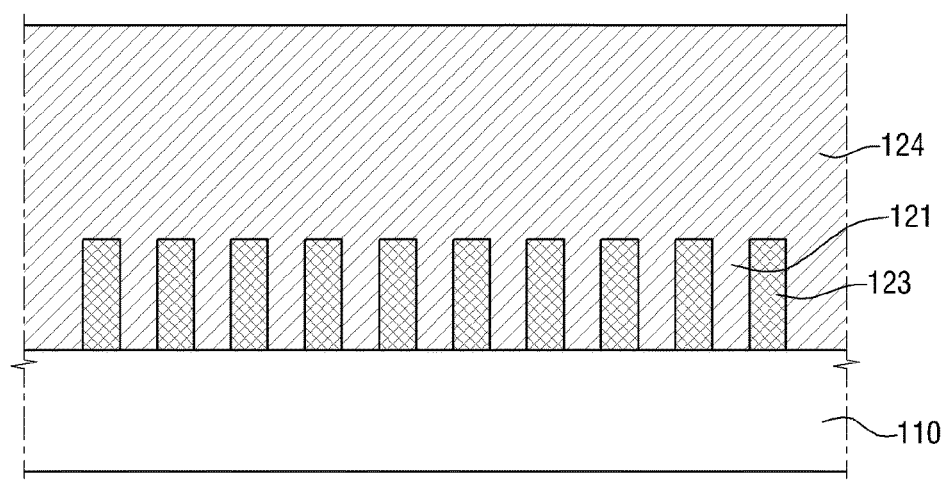

Referring to FIG. 14, conductive wire patterns 121 and a conductive material 124 may be formed on the entire surface of the substrate 110 and the patterned resin layer 123. The conductive wire patterns 121 may be formed in spaces of the patterned resin layer 123 using, but not limited to, long-throw sputtering, self-ionized sputtering or electroless plating having superior gap-filling characteristics.

Even if the conductive material 124 is formed using a process having superior gap-filling characteristics, an upper surface of the conductive material 124 may not be even due to the effect of the patterned resin layer 123. In this case, the upper surface of the conductive material 124 may be planarized by etching or CMP. However, the present concept is not limited to these methods. In a nonrestrictive example, the upper surface of the conductive material 124 may be planarized by repeating a deposition process and an etching process a number of times.

Figure 15:
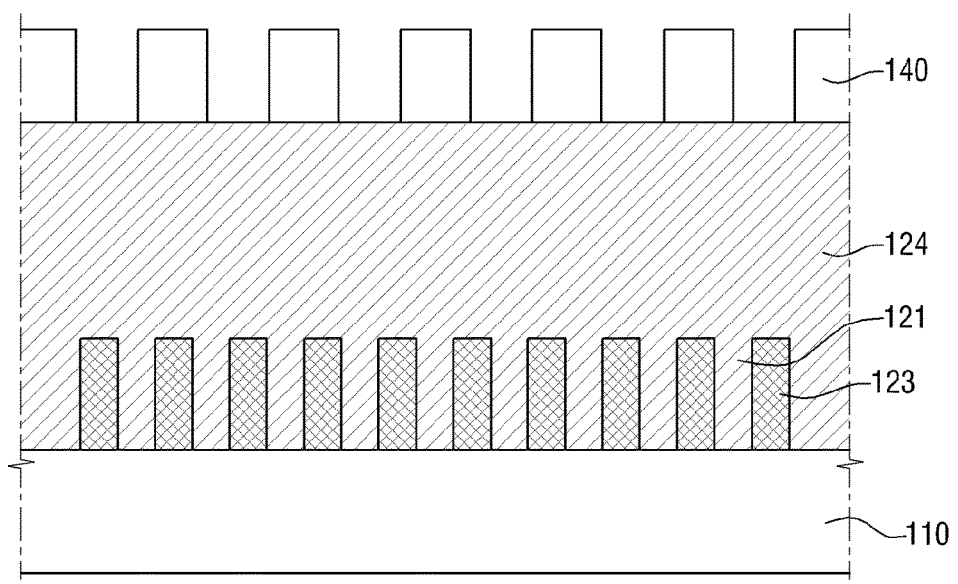

Referring to FIG. 15, mask patterns 140 may be formed on the conductive material 124. The mask patterns 140 may be formed using, but not limited to, nano-imprinting, photoresist, etc.

Figure 16:
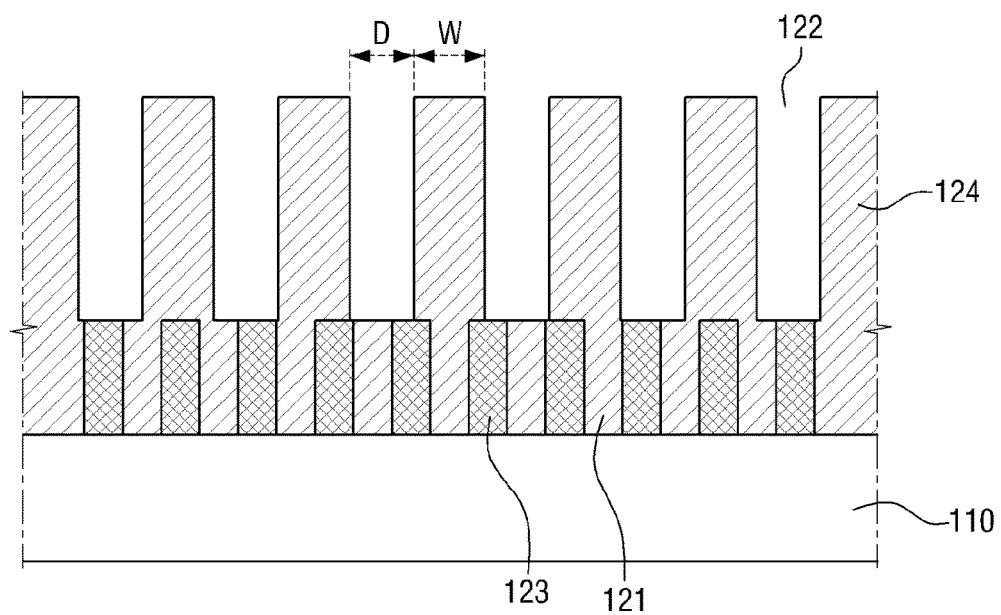

Referring to FIG. 16, a plurality of holes 122 may be formed by etching the conductive material 124 using the mask patterns 140. In a first region (not illustrated), a plurality of holes having a predetermined size D3 and period (D3+W3) may be located adjacent to each other to form one group. In a second region (not illustrated), a plurality of holes having a predetermined size D4 and period (D4+W4), which are different from those of the holes in the first region, may be located adjacent to each other to form one group.

Figure 17:
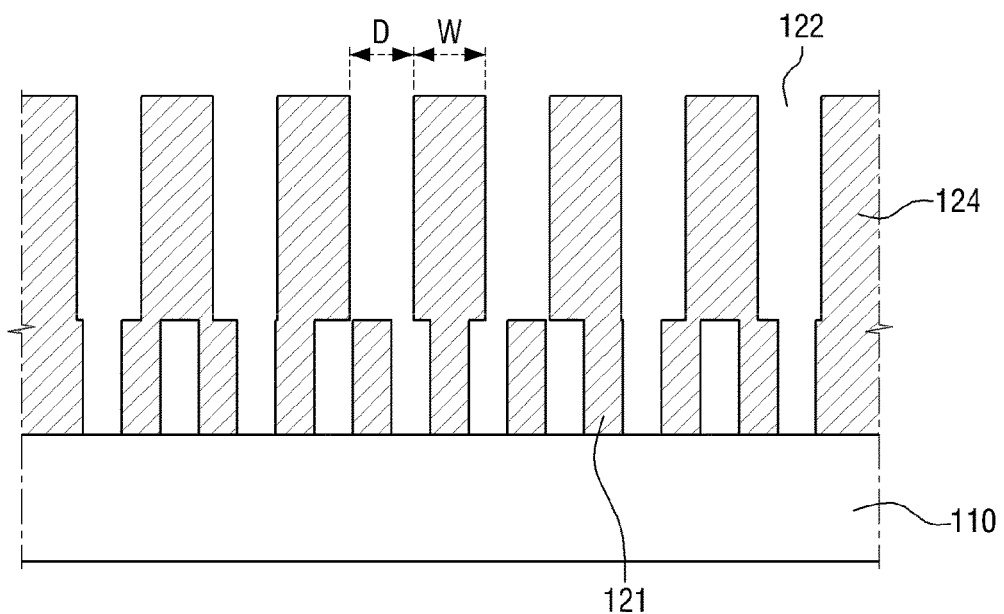

Referring to FIG. 17, the patterned resin layer 123 located in a space between the conductive wire patterns 121 may be removed. The removal of the patterned resin layer 123 may be achieved by, but not limited to, wet etching using an etchant having an etch selectivity with respect to the conductive wire patterns 121 or an ashing process using a gas.

Other elements of FIGS. 11 through 17 are similar to those of FIGS. 6 through 10, and a redundant description thereof is omitted.

Figure 18:
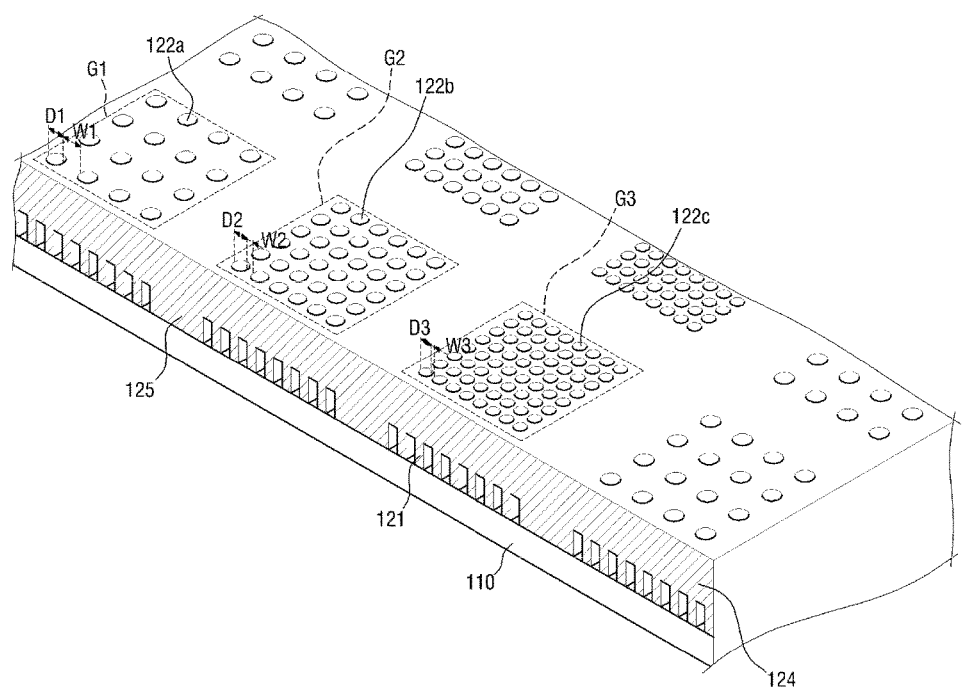
FIG. 18 is a partial perspective view of a color filter-integrated polarizer according to another embodiment of the present disclosure.

FIG. 18 is a partial perspective view of a color filter-integrated polarizer according to another embodiment of the present disclosure.

Referring to FIG. 18, the color filter-integrated polarizer according to the current embodiment may include a first group G1 of a plurality of adjacent holes 122a having a first size D5 and a first period (D5+W5), a second group G2 of a plurality of adjacent holes 122b having a second size D6 and a second period (D6+W6), and a third group G3 of a plurality of adjacent holes 122c having a third size D7 and a third period (D7+W7).

In one example, the first group G1, the second group G2 and the third group G3 may transmit wavelengths corresponding to red, green and blue, respectively. These three primary colors of light may be combined to express various colors.

A space between the first through third groups G1 through G3 may correspond to a non-aperture region (such as a wiring region or a TFT region) of a panel. Thus, conductive wire patterns may not be formed in the space.

Each of the first through third groups G1 through G3 may correspond to a pixel or a subpixel of a display device.

Other elements of FIG. 18 are similar to those of FIG. 1, and thus a redundant description thereof is omitted.

A color filter-integrated polarizer provided in the present disclosure makes it possible to produce a thinner display device. In addition, a method of manufacturing a color filter-integrated polarizer with increased process efficiency can be provided.

However, the effects of the present disclosure are not restricted to the one set forth herein. The above and other effects will be apparent to one of daily skill in the art to which the present disclosure pertains.

What is claimed is:

1. A color filter-integrated polarizer having a polarizer layer and a color filter layer arranged on and in direct contact with the polarizer layer,
    wherein the polarizer layer and the color filter layer are made of only a same conductive material, wherein the polarizer layer has a plurality of parallel conductive wire patterns, and the color filter layer has a plurality of holes formed in a pattern across the color filter layer,
    wherein at least one of the holes of the color filter layer overlaps at least one of the plurality of conductive wire patterns of the polarizer layer,
    wherein the polarizer layer and the color filter layer are integrally formed with each other,
    wherein a lower surface of the color filter layer directly contacts an upper surface of the at least one of the plurality of conductive wire patterns, and
    wherein the holes completely penetrate the color filter layer.

2. The polarizer of claim 1, wherein the color filter layer comprises:
    a first group of a plurality of adjacent holes having a first period and a first hole size;
    a second group of a plurality of adjacent holes having a second period and a second hole size; and
    a third group of a plurality of adjacent holes having a third period and a third hole size,
    wherein the first hole size, the second hole size, and the third hole size are different from each other.

3. The polarizer of claim 1, wherein the holes extend to a depth corresponding to surfaces of the conductive wire patterns, and
    wherein a planar shape of each of the holes is a circular shape.

4. The polarizer of claim 1, wherein the color filter layer comprises:
    a first group of a plurality of adjacent holes having a first period and a first hole size; and
    a second group of a plurality of adjacent holes having a second period and a second hole size;
    wherein holes of different groups are different in at least one of size and period.

5. The polarizer of claim 4, wherein the groups are arranged in a predetermined order in a repeating pattern.

6. The polarizer of claim 1, wherein a space between the conductive wire patterns has a refractive index of 1.0 to 1.3.

7. The polarizer of claim 6, wherein the space between the conductive wire patterns contains ambient air.

* * * * *